(12) United States Patent
Atluri et al.

(10) Patent No.: US 8,527,129 B2
(45) Date of Patent: Sep. 3, 2013

(54) PERSONALIZED CHARGING MANAGEMENT FOR A VEHICLE

(75) Inventors: Venkata Prasad Atluri, Ann Arbor, MI (US); Subhash B. Gullapalli, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 23 days.

(21) Appl. No.: 13/282,701

(22) Filed: Oct. 27, 2011

(65) Prior Publication Data

US 2013/0110330 A1    May 2, 2013

(51) Int. Cl.
    *B60L 9/00*    (2006.01)
(52) U.S. Cl.
    USPC .......................................... 701/22; 180/65.1
(58) Field of Classification Search
    USPC .......................................................... 701/22
    See application file for complete search history.

(56) References Cited

U.S. PATENT DOCUMENTS

| | | | |
|---|---|---|---|
| 8,089,242 B2* | 1/2012 | Loudot | 320/101 |
| 2009/0210357 A1* | 8/2009 | Pudar et al. | 705/412 |
| 2009/0218983 A1* | 9/2009 | Loudot | 320/101 |
| 2011/0202216 A1* | 8/2011 | Thai-Tang et al. | 701/22 |
| 2011/0202221 A1* | 8/2011 | Sobue et al. | 701/22 |
| 2011/0301790 A1* | 12/2011 | Atluri et al. | 701/22 |

* cited by examiner

*Primary Examiner* — Mary Cheung
*Assistant Examiner* — Michael Berns

(57) ABSTRACT

A configurable energy management system for recharging an electric vehicle. An in-vehicle renewable energy source generates electrical energy for recharging an in-vehicle energy storage device. The at least one off-vehicle renewable energy source provides electrical energy to the vehicle for recharging the in-vehicle energy storage device. A vehicle communication module transmits and receives data. An integration module integrates in-vehicle energy parameter data, in-vehicle renewable energy parameter data, off-vehicle renewable energy parameter data, user parameter data, and web-based data. A user interface device communicates user parameter data to the integration module. The user parameter data includes a prioritization of preferential parameters in re-charging the in-vehicle energy storage device. The integration module identifies an optimal energy source for re-charging the vehicle based on the in-vehicle energy parameter data, in-vehicle renewable energy parameter data, off-vehicle renewable energy parameter data, user parameter data, and the web-based data.

23 Claims, 2 Drawing Sheets

PERSONALIZED CHARGING MANAGEMENT FOR A VEHICLE

BACKGROUND OF INVENTION

An embodiment relates generally to energy management in vehicles.

Electric vehicles and hybrid electric vehicle utilize electrical stored electrical energy to power vehicle operating system such as an engine as well as a plurality of electrical devices within the vehicle. Various energy sources may be used to restore power to the vehicle energy storage device during recharging periods. Such energy sources may include solar energy, home area energy (e.g., wind turbines and other energy generating devices around a home), and electricity from an electric grid. It is the consumer's choice to select which energy source to choose from apart from a default strategy in the vehicle's control unit. A consumer's choice may not always be the most ideal choice from an economic standpoint (e.g., costly to draw from a grid during peak times) or non-practical (e.g., solar energy when light radiation is not sufficient).

It would be beneficial to have a management system that could advise which alternative is the best re-charging strategy given the time restraints and environmental conditions and vehicle conditions.

SUMMARY OF INVENTION

An advantage of an embodiment is a configurable energy management recharging system for an electric vehicle where the recharging method is determined based preferential parameters, vehicle operating conditions, and environmental conditions. The preferential parameters are prioritized by a user and include a time-based index, a cost-based index, and a green index. Vehicle operating condition data, environmental condition data, and the preferential parameter data are obtained and analyzed for recommending an optimal re-charging strategy that is conducive to the demands of the user while taking into consideration factors that have direct and indirect impact on the recharging process.

An embodiment contemplates a configurable energy management system for recharging an electric vehicle. An energy storage device stores energy. An in-vehicle renewable energy source generates electrical energy for recharging the in-vehicle energy storage device. The at least one off-vehicle renewable energy source provides electrical energy to the vehicle for recharging the in-vehicle energy storage device. A vehicle communication module transmits and receives data. An integration module integrates in-vehicle energy parameter data, in-vehicle renewable energy parameter data, off-vehicle renewable energy parameter data, user parameter data, and web-based data. A user interface device communicates with the vehicle communication module and the integration module. The user interface device communicates the user parameter data to the integration module. The user parameter data includes a prioritization of preferential parameters in re-charging the in-vehicle energy storage device. The preferential parameters include at least one of a time-based index, a cost-based index, and a green index. The web-based data is downloaded for use by the integration module. The integration module identifies an optimal energy source for re-charging the vehicle based on the in-vehicle energy parameter data, in-vehicle renewable energy parameter data, off-vehicle renewable energy parameter data, user parameter data, and the web-based data.

DETAILED DESCRIPTION

Figure 1:
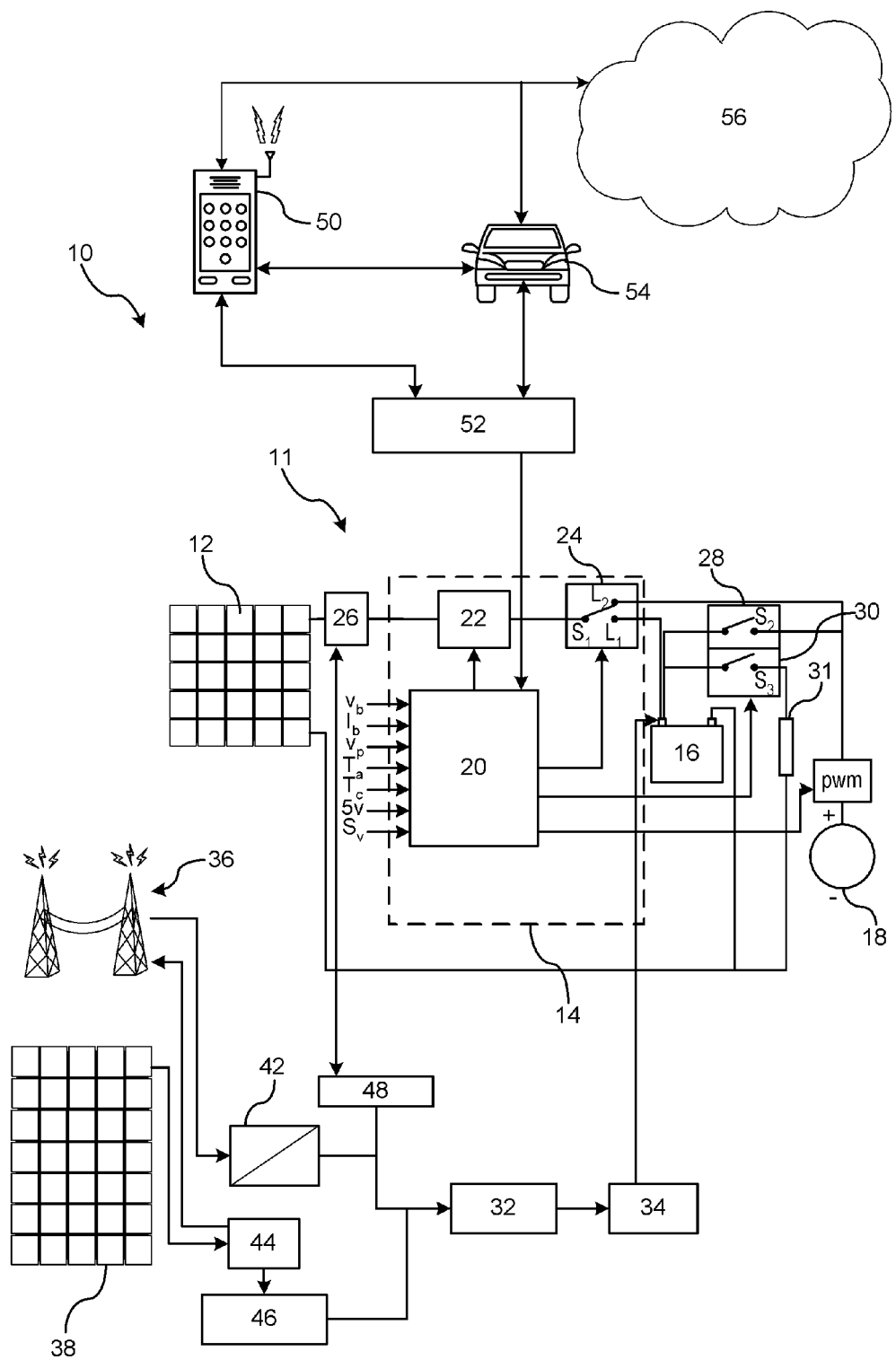
FIG. 1 is a block diagram of a personalized electric vehicle energy management system.
Figure 2:
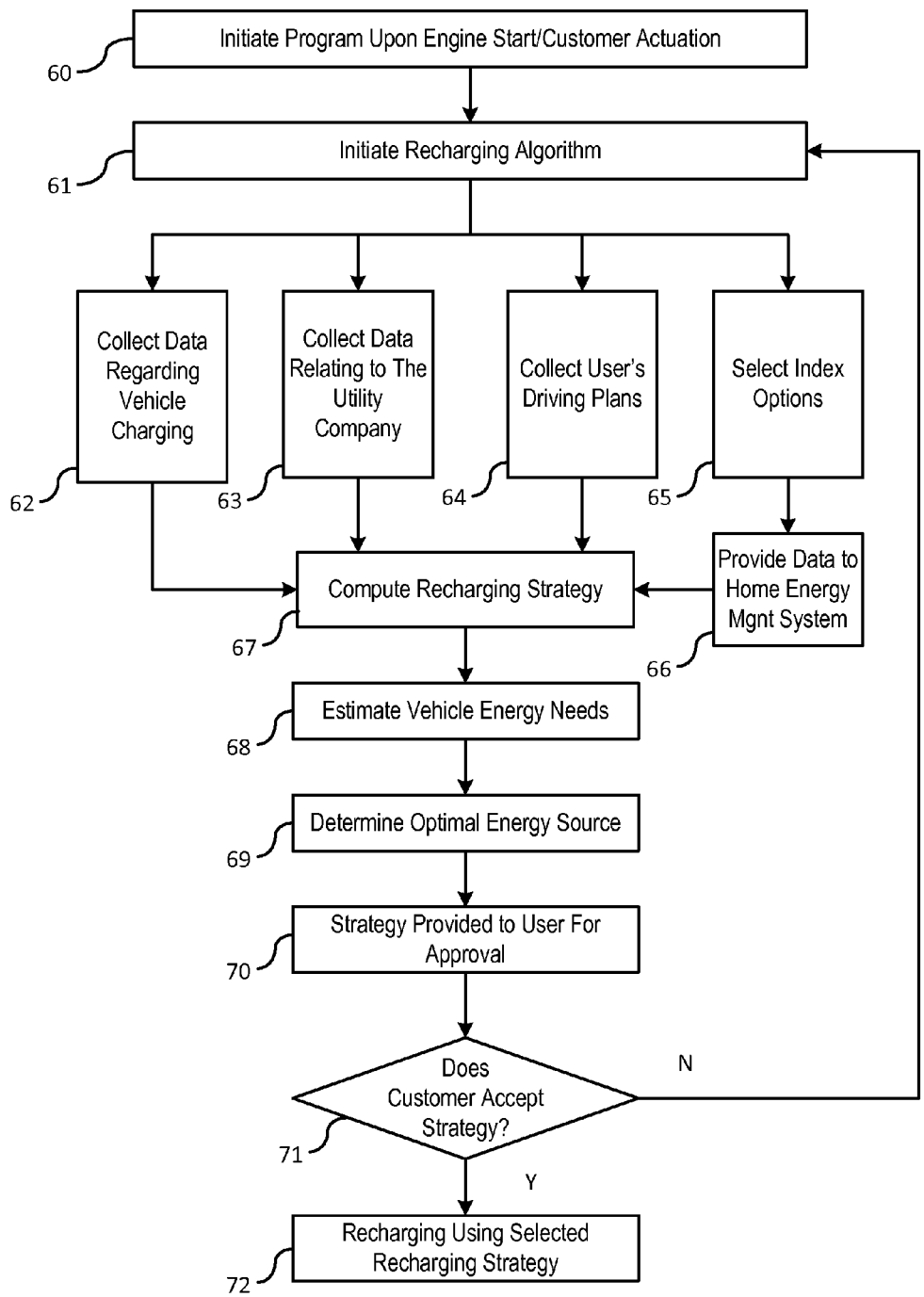
FIG. 2 is a flowchart of a method for determining the re-charging strategy.

There is shown in FIG. 1 a personalized charging energy management system 10 for selectively controlling electrical energy supplied to various components of a vehicle. The system 10 includes a vehicle energy distribution system 11 that includes a renewable energy source 12, such as onboard solar panel array, that is coupled to a solar control module 14 for distributing electrical energy to either an energy storage device 16 or to a preconditioning device such as an electric motor 18 (e.g., HVAC blower motor). It should be understood that the preconditioning device is not limited to a blower motor, but can include any propulsion system component.

The solar panel array 12 includes an array of panels made up of solar cells. The panels are interlinked, typically in series, so that voltage is additive and a desired voltage output can be achieved. The solar energy captured by the solar panel array 12 excites electrons in the solar cells for generating electricity. However, the solar cells can be coupled in a series-parallel configuration to achieve a desirable module voltage. The electricity generated by the solar panel array 12 is in the form of direct current (DC).

The solar control module 14 includes a processor 20, a DC/DC converter 22, and a switch 24. The DC/DC converter 22 is coupled between the solar panel array 12 and the switch 24. The DC/DC converter 22 converts either a low voltage DC generated by the solar panel array 12 into a high voltage DC or a high voltage DC generated by the solar panel array 12 into a low voltage DC. A current measuring device 26 may be coupled between the solar panel array 12 and the DC/DC converter 22, for monitoring the current flow from the solar panel array 12.

The switch 24 selectively couples the solar panel array 12 through the DC/DC converter 22 to either the energy storage device 16 or the motor 18. Coupling the solar panel array 12 to the energy storage device 16 is referred to as a recharging function, whereas coupling the solar panel array 12 to a preconditioning device, such as the motor 18, is referred to as a pre-conditioning function.

The pre-conditioning mode includes applying energy to a preconditioning device to precondition (i.e., modify) a temperature of the passenger compartment or a component of the vehicle. For example, a passenger compartment of a vehicle may be pre-conditioned (e.g., cooled) when parked by using the motor 18 energized with electrical energy generated by the solar panel array 12 when respective conditions are present. Other pre-conditioning devices may include, but are not limited to a pre-heater, such a heating device for an engine block or a three way catalytic converter.

Recharging function includes recharging the energy storage device 16 using electrical energy generated by the solar panel array 12 when other predetermined conditions are present. If the vehicle is parked and solar energy is being generated by the solar panel array 16, then recharging function may be enabled.

The processor 20 regulates the position of the switch 24 based on a plurality of conditions. The plurality of the conditions includes, but is not limited to, vehicle status (e.g., driving or parked), solar energy availability, battery voltage, and a temperature differential between the cabin temperature of the vehicle and exterior ambient temperature. The processor 20 also monitors the load demands of various vehicle components. Based on the load demands, the processor 20 may actuate a switch 28 to supply energy to the motor 18 from the energy storage device 16. The processor 20 may also actuate a switch 30 to distribute energy to a pre-conditioning unit 31 from the energy storage device 16. If the loads are at a demand level where neither the energy from the solar panel array 12 nor the energy storage device 16 can individually supply an adequate amount of energy to one or more vehicle components, such as the blower motor, then the energy from the solar panel array 12 and the energy storage device 16 may be cooperatively used to energize the one or more of the vehicle components.

The vehicle energy distribution system 11 further includes a battery electric vehicle high voltage storage device 32. The high voltage energy storage device 32 is coupled to an exterior source for acquiring high voltage energy from an external source. The high voltage storage device 32 is coupled to an auxiliary power module 34 that converts the high voltage received from the high voltage storage device 32 to a low voltage energy supply. The auxiliary power module (APM) 34 is coupled to the energy storage device 16 and the high voltage energy storage device 32. The APM 34 acts like an alternator on a conventional vehicle. The APM provides power flow between the vehicle high voltage (HV) DC bus and low voltage (LV) DC bus. The APM LV interface is connected to the vehicle LV DC bus along with low voltage battery.

The high energy voltage storage device 32 receives energy from a plurality of energy sources including, but not limited to, an external power grid 36, a home area source 38, and the in-vehicle renewable energy source 12. The external power grid 36 includes electrical energy received from an electrical utility source such an electrical power utility company that generates the electricity and distributes it to households and businesses. The external power grid 36 is coupled to the high voltage storage device 32 via an AC/DC converter 42.

The home energy source 38 includes alternative renewable sources generated at or near a home or other location where a vehicle may recharge. The home energy source 38 includes but is not limited non-vehicle solar panels, wind turbines, stored energy. The energy captured from the home energy source is coupled to a home energy management system 44 where energy is utilized for household purposes or stored in a household home energy storage device 46. The home energy management system 44 may be coupled to the vehicle high energy storage device 32 for selectively transferring energy from the home energy storage device 46 to the vehicle high energy storage device 32.

The in-vehicle renewable energy source 12 may include a solar panel array, natural gas, and other renewable energy source integrated as part of the vehicle. The in-vehicle renewable energy source 12 is coupled to the high voltage storage device 32 via a DC-DC converter 48 for providing captured energy by the solar panel array 12 to the high voltage storage device 32.

The configuration of the personalized electric vehicle charging management is identified by a user of the vehicle through an interface application 50 such as a smart phone. The smart phone 50 communicates with the vehicle through a vehicle communication module 52. The vehicle communication module 52 provides a communication link for transmitting and receiving messages and data between the vehicle and other remote entities or devices. The vehicle communication module 52 is further in communication with service provider 54. The service provider 54 may be a subscription-based communication service, such as OnStar®, that is currently provided by vehicle manufacturers on vehicles. This service is used to provide services such as, but not limited to, in-vehicle security, remote diagnostics systems, and turn-by-turn navigation through a wireless communication system. Remote services, such as Onstar®, have sufficient computing devices with processing power capability and large memory storage capability to execute statistical and analytical routines of the system 10. In utilizing a remote system in comparison to an in-vehicle based system, additional hardware and software that would otherwise be required for in each vehicle for a vehicle-based system is eliminated. However, in alternative embodiments, the service provider 54 may be an in-vehicle module.

The service provider 54 collects the user inputs, monitors vehicle energy storage conditions, obtains vehicle energy storage status conditions, and obtains other remote data for making recommending a recharging strategy. The user will utilize a smart phone 50 or similar device to input necessary information relating to driving plans for the day as well as the what recharging priorities, hereinafter referred to as indexes) are important to the user (e.g., cost, time, or green based recharging). The driving plans for the day may include a specific destination or route or may indicate a typical weekday or weekend drive that the customarily driven by the user. Additional information that may be used includes the departure times and the length of the drive. As described, the user may identify the importance of each index. The importance of each index may be classified as a high, medium, or low. Alternatively, any other rating system may be utilized.

The vehicle energy storage status is utilized for making an informed decision regarding the recommended recharging strategy. Such information may include a current rate of energy generation at the available sources, the available charging voltage (e.g., 120V or 240V), the energy storage devices current state-of-charge, state of health, the current vehicle loads or estimated vehicle loads that will be used on the trip (e.g., heater, A/C, lights, equipment chargers currently connected).

Cloud computing data 56 which relates to various information that affects recharging strategies may be obtained by the service provider 54 or may be obtained by a smartphone 50 and transmitted to the service provider 54. Cloud data 56 may include, but is not limited to, data relating to grid electricity, vehicle fuel information, electric charging stations, and weather information. Grid electricity information includes electricity usage and distribution rates, and a real-time green index. Vehicle fuel information includes pricing rates relating to local service refueling stations, including those refueling stations frequently visited by the user. Electric charging stations include location and price of in-path or nearby charging stations. Weather information provides details such as the available sunlight in the area for capturing solar energy from a solar panel array. Cloud data 56 may be obtained from one or a plurality of information retrieval sources. Examples of information retrieval sources may be a web-based source, weather station, or utility companies or web data service providers.

Once the necessary information is obtained, the service provider 54, analyzes all the data from the various sources and provides a prioritized recommendation as to the recharging strategy. Various user's preferences may be utilized. The following are some examples of user's preferences and the prioritized recommendation generated by the service provider based on parameter data obtained by the service provider:

Status Priority 1: Time Based (time=high, cost=med, GI=low)

Recharge Time: 3 hrs
Recharge Cost: $0.50
Recharge Green Index:
  Status Priority 2: Cost Based (time=med, cost=high, GI=med)
Recharge Time: 4 hrs
Recharge Cost: $0.35
Recharge Green Index:
  Status Priority 3: Green Index Based (time=low, cost=med, GI=high)
Recharge Time: 6 hrs
Recharge Cost: $0.30
Recharge Green Index: %%%

The service provider 54 may maintain vehicle specific information for a vehicle so that the vehicle-specific information may be utilized to determine the charging strategy for the vehicle. For example, the service provider 54 may maintain the vehicle identification number (VIN) and associated data for that vehicle. The associated data may include, but is not limited to, re-charging history, battery history, driving history. Re-charging history may include average re-charging time, average time of day for refueling or typical refueling levels. Battery history may include current charge of the battery, state-of-charge of the battery, state-of-health of the battery, and battery temperature. Driving history may include average driving time and duration and average driving distance. The service provider 54 may maintain and update the associated data as part of a typical vehicle monitoring operation. Data may be collected from data monitoring modules within the vehicle such as the powertrain control module, battery control module, vehicle supervisory control module or other associated modules.

The service provider 54 functions as an integrator that collects the information and executes routines for determining the re-charging strategy for outputting a recharging recommended strategy to the user. The recharging recommended strategy may be output via the user interface device 50 or other off-vehicle or in-vehicle interface.

The following methodology describes the process for managing the personalized recharging management strategy.

In block 60, the program is initiated. The program starts upon activation of the vehicle ignition switch or by a customer actuation.

In block 61, the service provider initiates an efficient re-charging algorithm wherein data is collected from various sources. The data is collected in blocks 62, 63, 64, and 65.

In block 62, vehicle charging/energy related information is obtained. Such information may include current rate of energy generation available for energy from the solar panel array of the vehicle or any other in-vehicle renewable energy source. Other information may include whether the recharging capability is 120V or 240V, the location of the vehicle relative to refueling stations, the battery SOC, and current vehicle loads currently operating on the vehicle. Moreover, load and other information can be utilized to determine if the vehicle can make it to a next destination without refueling prior to departing.

In block 63, a determination is made with regards to a user's utility plan associated with the utility company. Such information may include the type of utility, the charge rates, and charge rates for a specific time of day, and the maximum allowable energy flow rate.

In block 64, the user communicates enters its driving plans for the day via a smartphone, home energy-based management system, or a website. The user may input a typical driving plan that is customarily driven on a weekday basis or weekend basis, or may enter a specific driving plan.

In block 65, the driver selects one of the index options. The index options include a time-based index, a cost-based index, a green-based index based option, or a combination. The time-based option is departure based on the urgency for re-charging the vehicle (e.g., if the user plans an earlier than typical departure time). The cost-based index is based on whether the user wants the most economical cost for recharging the vehicle. The green index based is the re-charging utility having the lowest $CO_2$ footprint or highest green index.

In block 66, home energy related information is provided to a home energy management system, or through a website, or other long range communication network. The home energy related information includes information related to a current rate of energy generation at available resources. Such resources include house-based resources, wind-based resources, vehicle-based resource, or other renewable energy based resource.

In block 67, the information from blocks 62-66 are provided to the service provider, or similar, to computing a recharging strategy.

In block 68, the energy needs of the vehicle is estimated based on the following data that includes, but is not limited to, the expected driving distance, the SOC of the battery, weather conditions, traffic, driving plans, driving style, and map data.

In step 69, the optimal energy source for the customer is determined based on the user's preferences in regards to cost of the energy, the recharging time, and the green index.

In step 70, the determined recharging strategy is provided to the user for approval.

In step 71, a determination is made as to whether the customer accepts the determined recharging strategy. If the determination is made that the user accepted the recharging strategy, then the vehicle is programmed for recharging per the selected recharging strategy in step 72. If the user does not accept the recharging strategy, then a return is made to step 61.

While certain embodiments of the present invention have been described in detail, those familiar with the art to which this invention relates will recognize various alternative designs and embodiments for practicing the invention as defined by the following claims.

What is claimed is:

1. A configurable energy management system for recharging an electric vehicle comprising:
    an energy storage device for storing energy;
    an in-vehicle renewable energy source for generating electrical energy for recharging the in-vehicle energy storage device;
    at least one off-vehicle renewable energy source for providing electrical energy to the vehicle for recharging the in-vehicle energy storage device;
    a vehicle communication module for transmitting and receiving data;
    an integration module for integrating in-vehicle energy parameter data, in-vehicle renewable energy parameter data, off-vehicle renewable energy parameter data, user parameter data, and web-based data; and
    a user interface device for communicating with the vehicle communication module and the integration module, the user interface device communicating the user parameter data to the integration module, the user parameter data includes a prioritization of preferential parameters in re-charging the in-vehicle energy storage device, wherein the preferential parameters include at least one of a time-based index, a cost-based index, and a green index;

wherein the integration module identifies an optimal energy source for re-charging the vehicle based on the in-vehicle energy parameter data, in-vehicle renewable energy parameter data, off-vehicle renewable energy parameter data, user parameter data, and the web-based data.

2. The configurable energy management system of claim 1 wherein the integration module is a remote service provider communicating with the vehicle through the vehicle communication module, the remote service provider having computing devices with processing power capability and large memory storage capability to execute statistical and analytical routines for determining the prioritization of preferential parameters.

3. The configurable energy management system of claim 2 wherein the remote service provider includes a database for maintaining records of respective parameter data for each monitored vehicle.

4. The configurable energy management system of claim 3 wherein the remote service provider monitors a plurality of vehicle operations, wherein the plurality of vehicle operations is used in determining the prioritization of preferential parameters.

5. The configurable energy management system of claim 1 wherein the interface module is an in-vehicle processor capable of executing statistical and analytical routines.

6. The configurable energy management system of claim 1 wherein the at least one off-vehicle renewable energy source includes an electrical energy from an electric utility service provider.

7. The configurable energy management system of claim 1 wherein the at least one off-vehicle renewable energy source includes a home area solar energy generation system.

8. The configurable energy management system of claim 1 wherein the at least one off-vehicle renewable energy source includes a home area wind turbine generation system.

9. The configurable energy management system of claim 1 wherein the in-vehicle energy parameter data includes at least one of an available charging voltage, a state-of-charge of a vehicle battery, and enabled vehicle electrical loads.

10. The configurable energy management system of claim 9 wherein the in-vehicle energy parameter data further includes temperature data of the energy storage device.

11. The configurable energy management system of claim 1 wherein the user parameter data further includes a user-identified planned travel route.

12. The configurable energy management system of claim 1 wherein commercial energy parameter data is obtained by the integration module, wherein the commercial energy parameter data includes at least either of a cost of the commercial energy or a retail location of the commercial energy.

13. The configurable energy management system of claim 1 wherein the in-vehicle renewable energy source includes a solar panel array.

14. The configurable energy management system of claim 13 wherein the in-vehicle renewable energy parameter data includes regional weather forecast data for estimating an amount of sunlight radiation that can be captured by the in-vehicle solar panel array.

15. The configurable energy management system of claim 1 wherein the energy storage device is a low voltage energy storage device.

16. The configurable energy management system of claim 15 further comprising an in-vehicle high energy storage device, the in-vehicle high energy storage device configured to receive electrical energy from the in-vehicle renewable energy source and the at least one off-vehicle renewable energy source.

17. The configurable energy management system of claim 16 further comprising an auxiliary power module coupled between the in-vehicle high energy storage device and the low energy storage device, wherein the auxiliary power module converts the high voltage to a low voltage for distribution to the low energy storage device.

18. The configurable energy management system of claim 16 further comprising an AC-to-DC converter for converting AC voltage from the at least one off-vehicle renewable energy source to a DC voltage, the converted DC voltage being supplied to the in-vehicle high energy storage device.

19. The configurable energy management system of claim 16 further comprising an off-vehicle energy storage device for storing electrical energy from the at least one off-vehicle renewable energy source.

20. The configurable energy management system of claim 19 further comprising a DC-to-DC converter for transforming a first DC voltage from the at least one off-vehicle renewable energy source to a second DC voltage for storing in the in-vehicle high energy storage device.

21. The configurable energy management system of claim 1 wherein the user interface device is a wireless smartphone.

22. The configurable energy management system of claim 21 wherein the user interface device downloads web-based data that is provided to the integration module.

23. The configurable energy management system of claim 1 wherein the integration module downloads the web-based data.

* * * * *